United States Patent [19]
Neisler

[11] Patent Number: 5,192,601
[45] Date of Patent: Mar. 9, 1993

[54] DIMENSIONALLY STABILIZED, FUSIBLY BONDED MULTILAYERED FABRIC AND PROCESS FOR PRODUCING SAME

[75] Inventor: Henry P. Neisler, Kings Mountain, N.C.

[73] Assignee: Dicey Fabrics, Incorporated, Shelby, N.C.

[21] Appl. No.: 674,703

[22] Filed: Mar. 25, 1991

[51] Int. Cl.$^5$ .............................................. B32B 7/00
[52] U.S. Cl. ..................................... 428/120; 156/148; 156/308.2; 428/212; 428/229; 428/235; 428/259; 428/296; 428/340
[58] Field of Search .............. 428/235, 300, 120, 212, 428/229, 296, 340, 259; 156/148, 308.2

[56] References Cited

U.S. PATENT DOCUMENTS

| | | | |
|---|---|---|---|
| 1,384,808 | 7/1921 | Shiner | 428/175 |
| 1,629,923 | 5/1927 | McDermott | 428/235 |
| 2,528,129 | 10/1950 | Francis | 428/235 |
| 3,329,554 | 7/1967 | Hencken | 428/235 |
| 3,546,059 | 12/1970 | Isgur et al. | 428/235 |
| 3,554,852 | 1/1971 | Sugarman et al. | 428/236 |
| 3,565,745 | 2/1971 | Weber et al. | 428/300 |
| 3,922,454 | 11/1975 | Roecker | 428/235 |
| 4,069,361 | 1/1978 | Kumar | 428/235 |
| 4,159,360 | 6/1979 | Kim | 428/195 |
| 4,172,170 | 10/1979 | Foye | 428/213 |
| 4,542,060 | 9/1985 | Yoshida et al. | 428/237 |

Primary Examiner—James C. Cannon
Attorney, Agent, or Firm—Bell, Seltzer, Park & Gibson

[57] ABSTRACT

A fabric having the desired dimensional stability without the presence of a latex backing which is normally present thereon. The fabric includes a woven first layer formed of yarns having thermoplastic fibers and a nonwoven fibrous second layer contacting the woven first layer in underlying relation. A plurality of thermoplastic fibers are displaced from the woven first layer and extend into and through the nonwoven second layer. The displaced fibers are flattened and fusibly bonded to the nonwoven second layer to interconnect to the woven first layer and nonwoven second layer to each other. A method and apparatus for producing the fabric are also disclosed.

15 Claims, 2 Drawing Sheets

_Fig-6_

_Fig-7_

_Fig-8_

DIMENSIONALLY STABILIZED, FUSIBLY BONDED MULTILAYERED FABRIC AND PROCESS FOR PRODUCING SAME

FIELD OF THE INVENTION

The present invention relates to multilayered fabrics having a desired dimensional stability, and a process and apparatus for producing the same. In particular, the invention relates to an upholstery fabric formed of two fabric layers which are bonded together for superior dimensional stability.

BACKGROUND OF THE INVENTION

Woven fabrics formed of fibrous yarns have long been used to provide a decorative and protective cover to furniture items. The upholstery fabric typically covers cushions and the like which are normally subject to abrasive wear and repeated stresses arising from use of the furniture. For example, stress and wear are often caused by compression of fabric covered cushions by persons seated thereon. Seams formed by sewing multiple pieces of the upholstery fabric together must also resist separation after repeated stresses. Thus, to insure satisfactory performance, an upholstery fabric must have good dimensional stability and strength characteristics to withstand use in furniture applications.

To present satisfactory dimensional stability, single layer woven upholstery fabrics used in furniture applications such as sofas, chairs and the like must be relatively heavy fabrics. Consequently, such single layer upholstery fabrics are relatively expensive to manufacture, as fabrics meeting the above requirements are usually densely woven and have a high number of picks per unit area.

To reduce the expense associated with heavy upholstery fabrics, it has been common to apply a backing to the underside of the upholstery fabric to improve the dimensional stability of the fabric. In so doing, the weight per square yard of the woven upholstery fabric may be reduced, thereby resulting in considerable cost savings.

The most commonly used backing is a latex coating which is applied to the underside of the woven fabric. The latex is applied in liquid form to the fabric and is allowed to dry, thereby bonding to the fabric. It has been found that this approach interlocks the fibers in the woven upholstery fabric, thereby enhancing the dimensional stability of the woven fabric.

Application of a latex backing permits use of an upholstery fabric having a relatively lighter weight than could otherwise be used. A fabric having a latex backing often has a looser weave than a single layer fabric, thereby resulting in significant cost savings.

Although the latex backed fabrics as discussed above may exhibit good dimensional stability, they are also usually substantially stiffer than fabrics which do not have a latex backing. The stiffness of the fabric is also referred to as its hand. A fabric having a good hand is relatively flexible, whereas a stiffer fabric is said to have a poor hand.

The stiffness, or hand, of a fabric is often quite significant in many applications. For example, stiffness is frequently of concern when upholstery fabric is applied to a furniture article. A fabric which is too stiff may be difficult for the upholsterer to use, as the stiffened fabric may not conform adequately to curves, bends and the like which are formed into the furniture frame or cushions. Such problems often result from the use of latex backed fabrics. The stiffness of a latex backed upholstery fabric may also be noticeable to persons seated on the upholstered furniture.

In addition to problems relating to increased stiffness, the use of a latex coating as a fabric backing also often fails to solve adequately the strength problems, including seam slippage, associated with use of lighter weight woven fabrics. Moreover, latex is difficult to handle in a manufacturing environment, as the latex must be applied to the fabric in liquid form. Liquid latex must be handled with care for health and environmental reasons.

Another drawback of using latex as a fabric backing is that the latex may not be applied to the full width of the fabric. For example, after the fabric has been coated, clips are used to engage the edges of the fabric to convey it through a tenter frame for drying the latex coating. Because the clips must engage an area of up to about two inches wide along each edge of the fabric, the edges of the fabric cannot be coated with the latex so that the edges will be dry for handling by the clips. The uncoated edges cannot be used as finished upholstery fabric and must therefore be cut away from the coated fabric.

In many applications, the fabric destined to be coated is initially woven in a width of 54 inches. After the fabric is coated with latex and the unusable uncoated edges removed, however, the resultant fabric may be only 50 inches wide. As may be readily seen, this practice wastes a significant amount of the woven fabric and therefore increases the cost of production.

Other prior art techniques for producing multilayered fabrics having a desired dimensional stability are shown in U.S. Pat. No. 4,159,360 to Kim and U.S. Pat. No. 4,172,170 to Foye. The Foye '170 patent shows a woven upholstery fabric attached to a nonwoven scrim. Fibers are needle punched from the woven layer through the nonwoven scrim after which a latex coating is applied which adheres to the nonwoven backing and the needle punched fibers. Thus, the composite fabric shown in the Foye '170 patent relies on a latex coating to retain its integrity, much the same as any latex backed fabric.

The stabilized fabric shown in the Kim '360 patent has a woven, knitted or tufted fabric layer which is needle punched and bonded to a backing layer of nonwoven fibers by an intermediate layer of thermoplastic material. Inclusion of a third layer of thermoplastic material within the woven and nonwoven fibrous layers increases the cost and complexity of manufacturing the multilayered fabric.

In light of the aforementioned deficiencies, it is an object of the present invention to provide a fabric having the desired dimensional stability without the presence of a latex backing which is normally present thereon. Another object of the present invention is to provide a multilayered upholstery fabric having the desired flexibility or hand and the desired dimensional stability. Yet another object of the present invention is to provide a method for producing a fabric having the desired hand and dimensional stability without the application of a latex backing. A further object of the present invention is to provide an apparatus for producing an upholstery fabric having the desired hand and dimensional stability without the use of a latex backing. Another object of the present invention is to provide a dimensionally stabilized fabric which may be manufactured without cutting away the edges of the fabric. A still further object of the present invention is to provide a process for producing a dimensionally stabilized fabric without the use of environmentally hazardous and difficult to handle liquids.

SUMMARY OF THE INVENTION

The above and other objects and advantages of the present invention are achieved in the embodiments described herein by the provision of a woven first layer formed of yarns of thermoplastic fibers and a nonwoven fibrous second layer contacting the woven first layer in underlying relation. A plurality of thermoplastic fibers are displaced from the yarns in the woven first layer by needle punching such that the displaced fibers extend into and through the nonwoven second layer. Heating of the multilayered fabric flattens the displaced thermoplastic fibers against the nonwoven second layer and softens the displaced fibers to effect a fusible bonding of the displaced fibers and the nonwoven second layer, thereby interconnecting the woven first layer and the nonwoven second layer to each other. In a first preferred embodiment, the woven first layer has weft yarns formed of polypropylene fibers and warp yarns formed of polyester fibers, and the nonwoven backing is formed of polypropylene fibers. In this embodiment, the fibers in the nonwoven second layer are also softened by heating so that a fusible bond is also effected directly between the nonwoven second layer and the underside of the woven first layer. A second preferred embodiment has a woven first layer with weft yarns formed of nylon 6 fibers and warp yarns formed of nylon 6 or nylon 6,6 fibers, and a nonwoven fibrous second layer having nylon 6,6 fibers. A third preferred embodiment has a woven first layer with weft yarns of polypropylene fibers and warp yarns of polyester fibers, and a nonwoven second layer with nylon 6,6 fibers. In a fourth embodiment, in which the weft yarns are formed of nylon 6 fibers and warp yarns of nylon 6 or nylon 6,6 fibers, and the nonwoven second layer is formed of polyolefin fibers, the displaced fibers are flattened and are bonded to the nonwoven second layer by softening of the polyolefin fibers in the second layer.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings which illustrate preferred and exemplary embodiments, and wherein.

DESCRIPTION OF THE PREFERRED EMBODIMENT

Figure 1:
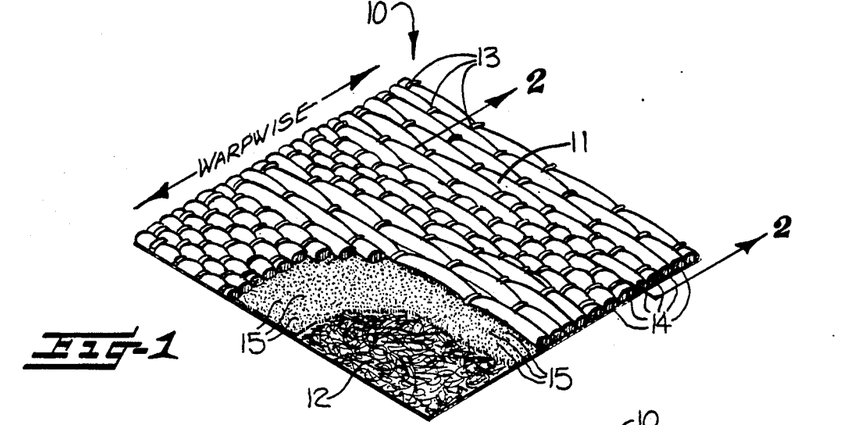
FIG. 1 is a partially cut away perspective view of a preferred embodiment of a fabric made in accordance with the present invention.

Referring now to the drawings, FIG. 1 is a perspective view of a preferred embodiment of a fabric made in accordance with the present invention designated generally at 10. As shown therein, the fabric 10 includes a woven first layer 11 and a nonwoven fibrous second layer 12. The nonwoven second layer 12 underlies the woven first layer in contacting relationship.

Figure 2:
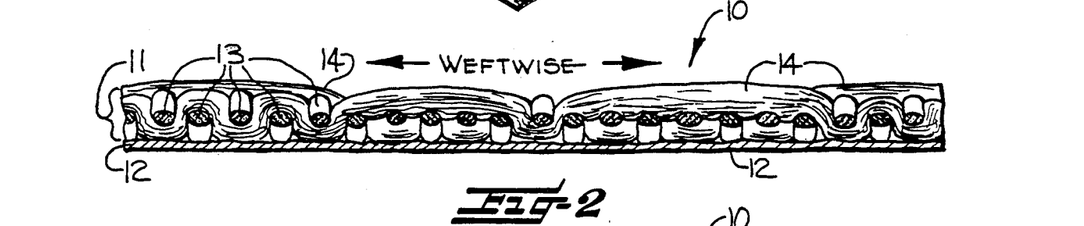
FIG. 2 is a cross section view taken along line 2—2 of FIG. 1 which illustrates the multilayered fabric parallel to the weft yarns of the woven first layer prior to needle punching.
Figure 3:
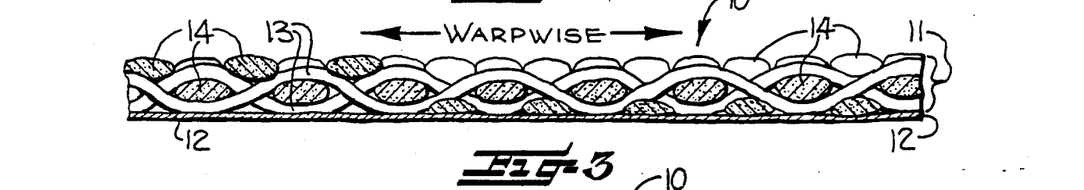
FIG. 3 is a cross section view taken parallel to the warp yarns of the woven first layer of the fabric prior to needle punching.
Figure 4:
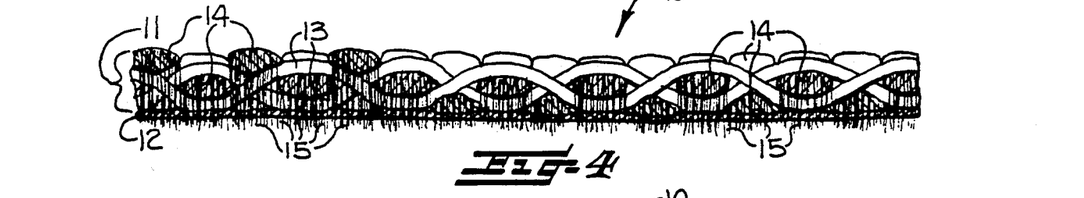
FIG. 4 is a cross section view taken parallel to the warp yarns of the fabric illustrated in FIG. 1 after needle punching of the fabrics but prior to applying heat to the fabric layers.
Figure 5:
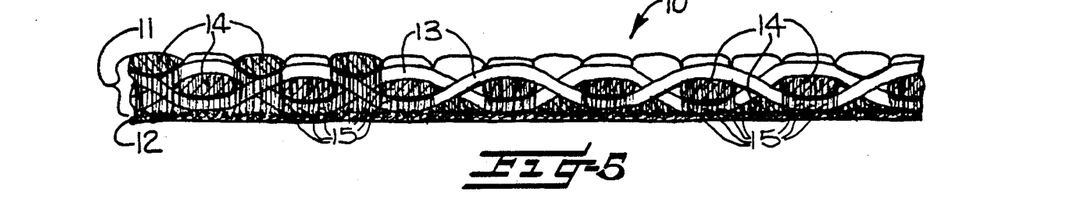
FIG. 5 is another cross section view taken parallel to the warp yarns of the fabric illustrated in FIG. 1 after application of heat to the backing layer and displaced thermoplastic fibers.

FIGS. 2, 3 and 4 illustrate the fabric 10 at several stages during its manufacture, and FIG. 5 illustrates the finished product. As clearly depicted in FIGS. 2 and 3, the first layer 11 includes a plurality of warp yarns 13 and Weft yarns 14 which are woven together, preferably in a jacquard weave. The weft yarns 14 are formed of thermoplastic fibers, and the Warp yarns 13 may also be formed of thermoplastic fibers. In preferred embodiments, the weft yarns 14 are much larger in size than the Warp yarns 13.

As illustrated in FIGS. 1, 4 and 5, the fabric 10 includes a plurality of thermoplastic fibers 15 which are displaced from the woven first layer 11 by needle punching or the like. The displaced fibers 15 extend into and through the nonwoven fibrous second layer 12. FIG. 5 shows that the displaced thermoplastic fibers 15 are flattened against the distal side of the nonwoven second layer 12 and are fusibly bonded to the nonwoven second layer 12 to interconnect the woven first layer 11 and nonwoven second layer 12 to each other.

In preferred embodiments of the invention, the fusible bonding of the displaced thermoplastic fibers 15 and the nonwoven second layer 12 is effected by softening of the thermoplastic fibers 15 due to heating above their softening temperature. Also, the nonwoven second layer 12 has strength in both primary directions so as to provide dimensional stability in both the warp and weft directions of the fabric 10.

EXAMPLE 1

In a first preferred embodiment of the invention, the weft yarns 14 of the woven first layer 11 are formed of polyolefin fibers, preferably polypropylene, having a softening temperature of between about 285° F. and 330° F. Also in this embodiment, the warp yarns 13 of the woven first layer 11 are formed of polyester fibers having a much higher softening temperature than the polyolefin fibers forming the weft yarns 14. The Weft yarns 14 formed of polyolefin fibers are preferably much larger in size than the warp yarns formed of polyester fibers so that the greater number of displaced thermoplastic fibers 15 extending into and through the nonwoven second layer 12 are polyolefin fibers displaced from the weft yarns 14. It has been found that satisfactory results are obtained when the woven first layer 11 is a jacquard weave fabric having about 78 percent polyolefin fibers and 22 percent polyester fibers.

Also in the first preferred embodiment, the nonwoven second layer 12 is formed of polyolefin fibers such as polypropylene having a softening temperature substantially the same as the polyolefin fibers in the woven first layer 11. It has been found that a spun bonded polypropylene fabric having a weight of about 0.5 ounces per square yard, a thickness of 4.1 Mils, and an air permeability of 880 cu. ft./sq. ft./min. may be used as the nonwoven second layer 12 with good results. Other nonwoven fabrics having a weight of up to about 1.0 ounce per square yard have also been used.

The polypropylene fibers of the second layer 12 may be such that they soften at between about 300° F. and 320° F. and melt at between about 325° F. to 340° F. Because the ranges of the softening temperatures of the fibers in the weft yarns 14 and the nonwoven second layer 12 overlap, fusible bonding may occur in this embodiment between the displaced fibers 15 and the nonwoven second layer 12 as well as directly between the nonwoven second layer 12 and the underside of the woven first layer 11.

EXAMPLE 2

A second preferred embodiment of this invention has a woven first layer 11 in which the warp yarns 13 are formed of nylon 6 or nylon 6,6 fibers. The weft yarns 14 of the woven first layer 11 are in this case formed of nylon 6 fibers which soften or melt between about 419° F. and 430° F. In this embodiment, the nonwoven fibrous second layer 12 is formed of nylon 6,6 fibers having a softening or sticking temperature of about 445° F. and a melting temperature of between about 480° F. to 500° F.

EXAMPLE 3

A third preferred embodiment of this invention has a woven first layer 11 with warp yarns 13 formed of polyester fibers and weft yarns 14 formed of polyolefin fibers such as polypropylene, similar to the first layer 11 used in the first embodiment. As in the previous embodiments, it is preferred that the weft yarns 14 predominate in the woven first layer 11 so that the greater number of the fibers 15 which are displaced from the first layer 11 are polyolefin. This embodiment, however, has a nonwoven second layer 12 which is formed of spun bonded nylon 6,6 fibers having a softening or sticking temperature of about 445° F. and a melting temperature of between about 480° F. to 500° F. The nonwoven second layer 12 may be less than about 0.6 ounces per square yard in weight, although a weight of about 0.5 ounces per square yard has been found to be ideal.

EXAMPLE 4

A fourth embodiment of this invention uses a woven first layer 11 having weft yarns 14 formed of nylon 6 fibers and warp yarns 13 formed of nylon 6 or nylon 6,6 fibers. The nonwoven second layer 12 is formed of polyolefin fibers such as polypropylene. In this embodiment, however, the fibers 15 which are displaced are not softened by heating but are flattened across the distal side of the nonwoven second layer 12 and are fusibly bonded thereto by softening of the polyolefin fibers in the nonwoven second layer 12.

Fabric made in accordance with the present invention has a significantly improved hand, as the absence of a latex backing permits the fabric to be significantly more flexible than a fabric having a latex backing. Customers who have seen and used fabric made in accordance with the present invention consider it to be a premium product due to the improved hand and feel of the fabric relative to latex backed fabrics. The interconnection of the woven first layer 11 and the nonwoven second layer 12 provides the desired strength characteristics and dimensional stability.

Testing of fabrics made in accordance with the present invention verifies that these fabrics have the desired dimensional stability and strength. Relative to other fabrics, including those having a latex backing, the dimensional stability and strength of fabric made in accordance with the present invention may also be slightly improved. As shown below in tabular form, samples of multilayered fabric made in accordance with the third embodiment of the present invention (i.e., having polyester warp yarns 13 and polypropylene fibers in the weft yarns 14 of the woven first layer 11 and nylon 6,6 fibers in the nonwoven backing layer 12) were tested along with samples of a latex backed upholstery fabric and an unlatexed upholstery fabric. A bonded fabric having displaced fibers 15 needle punched from a woven first layer 11 and fusibly bonded to the underside thereof, but which lacked a nonwoven second layer 12, was also tested.

The nonwoven second layer 12 of two of the fusibly bonded multilayered samples had a weight of about 0.6 ounces per square yard, while another sample had a second layer 12 weighing about 0.2 ounces per square yard. The woven fabric in the bonded, latex backed and unlatexed fabric samples were identical to the woven first layer 11 of the multilayered fabrics which were tested.

Each sample was tested for breaking strength, tear strength, and two types of seam slippage strength. Breaking strength and tear strength were tested by application of a static force. The industry standard for acceptable breaking strength is 50 lbs., and the standard for tear strength is six pounds.

Seam slippage was tested on a Scott seam tester, which uses a static force to test seam separation. The accepted minimum passing value for the Scott test is 25 lbs. A dynamic seam test was also conducted in which sewn samples of the fabrics were subjected to repetitive loading which simulates use of the fabric at a seam on an upholstered cushion or the like. The industry standard for the dynamic seam test is survival of at least 5,000 cycles with seam separation of less than 3.0 mm. The dynamic seam test is considered critical in evaluating upholstery fabrics because this test most closely simulates actual use of the fabric in upholstery applications.

The breaking, tear, and Scott seam tests were conducted in both the weft, or filler (F), and warp (W) directions. The test results are tabulated below:

|  | F & W 50 lbs. Break | F & W 6 lbs. Tear | F & W 25 lbs. Scott Seam | W-5000 Dynamic Seam |
|---|---|---|---|---|
| woven fabric without backing | F-75+ lbs W-75+ | F-18 lbs W-18 | F-45 lbs W-30 | 336 cycles (failed) (3 mm) |
| woven fabric with latex backing | F-75+ W-75+ | F-15 W-6 | F-45 W-45 | 5000 (pass) (1 mm) |
| bonded (no backing) | F-75+ W-75+ | F-12 W-12 | F-45 W-45 | 5000 (pass) (2 mm) |

-continued

| | F & W 50 lbs. Break | F & W 6 lbs. Tear | F & W 25 lbs. Scott Seam | W-5000 Dynamic Seam |
|---|---|---|---|---|
| multilayer 0.2 oz/yd² backing | F-75+ W-75+ | F-11 W-10 | F-45 W-45 | 5000 (pass) (2.5 mm) |
| multilayer 0.6 oz/yd² nonwoven layer | F-75+ W-75+ | F-10 W-8 | F-45 W-36 | 5000 (pass) (1 mm) |
| multilayer 0.6 oz/yd² nonwoven layer | F-75+ W-75+ | F-15 W-8 | F-50+ W-48+ | 5000 (pass) (.5 mm) |

The results of the Scott and dynamic seam slippage tests indicate that fabric made in accordance with the present invention provides the desired seam strength and seam slippage performance, and that somewhat improved performance relative to latex backed and unlatexed woven fabrics may also be obtained. The woven fabric without any backing failed the seam slippage test after only 336 cycles and had the poorest results in the Scott test of all the fabrics that were tested. The latex backed fabric performed better, surviving 5000 cycles in the seam slippage test with 1 mm seam separation and having slightly improved strength in the Scott test. However, one sample of the multilayered fabric having a 0.6 oz/yd² nonwoven second layer performed equally as well in the dynamic test, with only 1 mm seam separation after 1000 cycles, whereas the second sample performed even better, surviving 5,000 cycles in the seam slippage test with seam separation of only 0.5 mm. Also, the results of the Scott seam test for the final sample of multilayered fabric having a 0.6 oz/yd² nonwoven layer were substantially improved over the other samples, as the Scott test values shown in the chart for this sample represent the maximum capacities of the test machine.

The test results also show that all of the samples passed the breaking test. The 75 lb. values shown on the chart represent the maximum capacity of the test machine. In the tear test, all of the samples exceeded the industry minimum standard.

Figure 6:
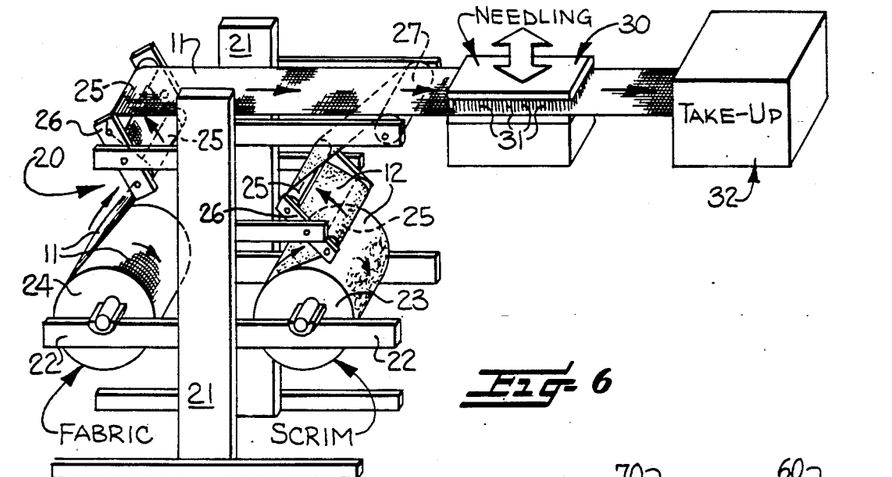
FIG. 6 is a partially schematic perspective view of an apparatus for laminating and needle punching the fabric layers for use in the present invention.
Figures 7, 8:
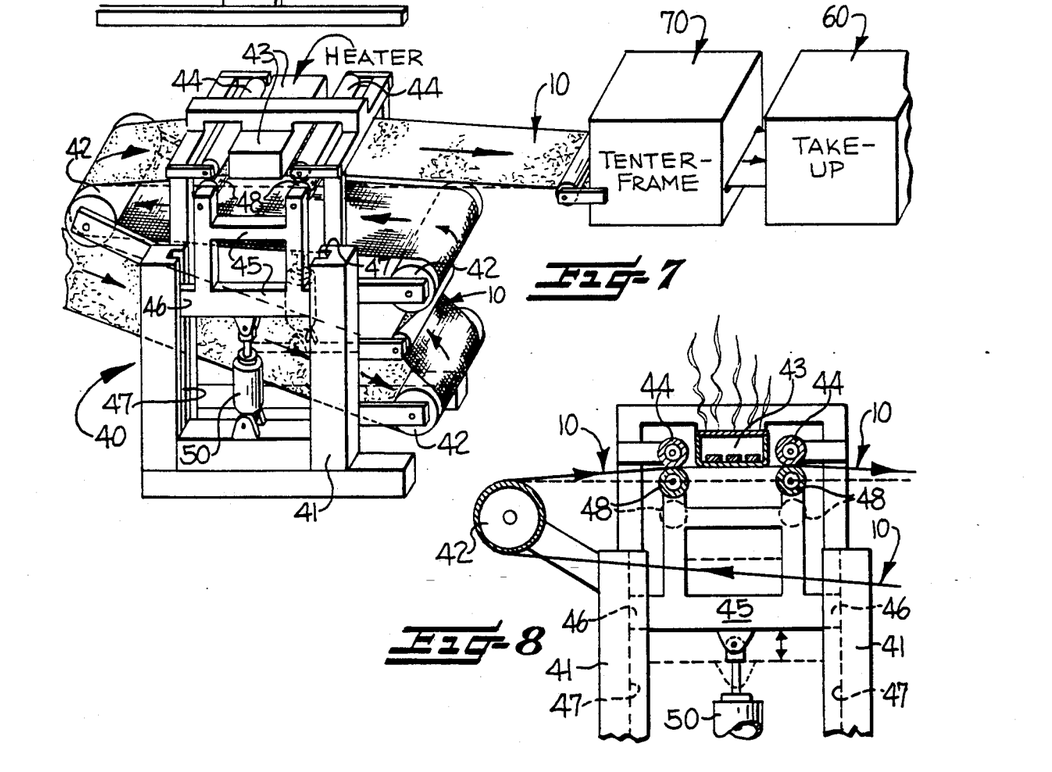
FIG. 7 is a partially schematic perspective view of an apparatus for fusibly bonding the fabric layers of the present invention.
FIG. 8 is a side elevation view of the apparatus illustrated in FIG. 7.

Referring again to the drawings, FIGS. 6, 7 and 8 illustrate apparatus for producing the fabric 10 of the present invention. As shown in FIG. 6, a laminating and needle punching apparatus indicated generally at 20 includes a frame 21 with arms 22. The arms 22 support a roll 23 of nonwoven fabric for forming the nonwoven second layer 12 of FIGS. 1 through 5 and a roll 24 of woven fabric for forming the woven first layer 11.

Two sets of tension biasing rolls 25 are supported by subassemblies 26 which are rotatably supported by the frame 21 above the rolls 23 and 24. Springs or similar means are provided which bias the subassemblies 26 for rotation about their rotatable supports on the frame 21. In the embodiment illustrated in FIG. 6, the subassemblies 26 are biased in a counterclockwise direction. Fabric from the rolls 23 and 24 is directed over opposite sides of the tension rolls 25 so that rotation of the subassemblies 26 maintains constant tension in the fabric layers 11 and 12.

After passing through the tension rolls 25, the woven fabric 11 and nonwoven fabric 12 move over a support roll 27 such that the woven fabric layer 11 is arranged in overlying, contacting relationship with the nonwoven fabric layer 12. The adjacent fabric layers 11 and 12 are then directed through a needle punch station 30.

In a preferred embodiment, the needle punch station 30 has a bed of single barb, reverse fish hook needles 31 positioned over the path of travel of the contacting fabric layers 11 and 12. The density of the needles 31 may vary according to the specific fabric being used as the woven first layer 11. The needles 31 rapidly move vertically such that they first penetrate the woven fabric layer 11. The needles 31 may also oscillate laterally to aid in obscuring the points where they penetrate the woven fabric 11.

When the needles 31 pass through the fabric layer 11, the barbs engage one or more fibers of the warp yarns 13 or weft yarns 14 to displace them from the woven first layer 11. As the downward motion of the needles 31 continues, the barbs thereon move through the nonwoven second layer 12 to further displace the engaged thermoplastic fibers and to direct them into and through the nonwoven fabric layer 12 such that portions of the displaced thermoplastic fibers 15 protrude beyond the distal side of the nonwoven fabric layer 12.

After passing through the needle punch station 30, the contacting woven fabric layer 11 and nonwoven fabric layer 12 are interconnected by the displaced thermoplastic fibers 15. FIG. 4 is a cross section view of the contacting fabric layers following the needle punching operation.

Following needle punching, the interconnected first and second layers 11 and 12 are gathered by takeup means 32. Takeup means 32 may be any suitable apparatus, including a driven roll or the like.

FIG. 7 illustrates a second apparatus 40 used to manufacture the fabric 10. Apparatus 40 is used to effect a fusible bonding between the layers 11 and 12 after they have been needle punched by the first apparatus 20. The apparatus 40 has a frame 41 which supports a plurality of rolls 42 on opposite sides thereof, around which the overlying, contacting woven first layer 11 and nonwoven second layer 12 are directed.

A heater plate 43 is stationarily mounted near the top of the frame 41 above the path of travel of the woven fabric layer 11 and nonwoven second layer 12. The needled together fabric layers 11 and 12 are fed under the heater plate 43 such that the distal side of the nonwoven layer 12 and the displaced fibers 15 protruding therefrom are turned upwardly to face the heater plate 43. The heater plate 43 has a stationary surface so that the displaced fibers 15 which are softened by the heater plate 43 will be flattened across the nonwoven second layer 12. In an alternative embodiment, a heated stationary roll may be used in place of the heated plate 43.

In a preferred embodiment, the heater plate 43 is heated with an oil circulating heater, which has been found to give uniform heating and therefore the best results. Alternatively, the heater plate 43 may be heated by electric resistance heating elements or other suitable means. In one preferred embodiment, when the apparatus 40 is used to produce a fabric 10 having a first layer 11 with weft yarns 14 formed of polyolefin fibers, the heater plate 43 is maintained at a temperature of about 330° F. Where other fibers are used, the heater plate may be set to a temperature which is appropriate to cause fiber softening and fusible bonding.

Small rolls 44 are rotatably mounted on bearings adjacent the heater plate 43 such that the rolls 44 are parallel to the upstream and downstream edges of the heater plate 43 relative to the direction of travel of the fabric layers 11 and 12 beneath the heated plate 43.

A sliding subframe 45 is mounted within the frame 41 such that fingers 46 are received within vertical tracks 47 on each side of the frame 41. The subframe 45 has two small guide rolls 45 rotatably mounted near its upper end. Cooperation of the fingers 46 and tracks 47 permit the subframe 45 and the guide rolls 48 mounted thereon to move toward and away from the heater plate 43, as illustrated in FIG. 8.

As best shown in FIG. 7, in a preferred embodiment pneumatic cylinders 50 extend upwardly from the bottom regions of the frame 41 to support the subframe 45 and to urge the subframe 45 and guide rolls 48 thereon upwardly within the tracks 47 toward the heater plate 43. Other means for moving the subframe 45 and the guide rolls 45 may also be used. When the pressure of the air in the cylinders 50 is relieved, the subframe 45 and guide rolls 48 fall freely downward away from the heater plate 43 due to gravity.

Conveying or takeup means 60 moves the fabric layers 11 and 12 through the apparatus 40. When the apparatus 40 is used to effect a fusible bonding of the needled together layers 11 and 12, the pneumatic cylinders 50 are engaged to move the guide rolls 48 toward the heater plate 43 to deflect the path of travel of the needled together fabrics 11 and 12 toward the heater plate 43. As shown in FIG. 8, this deflection causes the distal side of the nonwoven second layer 12 and the displaced thermoplastic fibers 15 protruding therefrom to contact the heater plate 43.

The fabrics 11 and 12 are kept moving in this deflected path of travel while they are being conveyed beneath the heated plate 43. However, when the take up means 60 conveying the needled together fabrics 11 and 12 is stopped, the air pressure in the pneumatic cylinders 50 is relieved and the subframe 45 and guide rolls 48 thereon move downwardly away from the heater plate 43 due to gravity. Thus, the deflection caused by the guide rolls 48 is also relaxed, and the nonwoven fabric 12 and the displaced thermoplastic fibers 15 protruding therefrom move out of contact with the heater plate 43. This prevents the heater plate 43 from overheating the fabric layers 11 and 12 and causing damage thereto.

Passage of the needled together fabric layers 11 and 12 beneath the heater plate 43 causes the thermoplastic fibers 15 to become bonded to the nonwoven second layer 12, thereby interconnecting the layers 11 and 12 to form the multilayered fabric 10. Lateral movement of the heated, softened displaced fibers 15 across the stationary heater plate 43 flattens the softened fibers 15 over the exposed side of the nonwoven fabric 12, thereby improving the bond between the nonwoven layer 12 and the displaced fibers 15. Of course, if the thermoplastic fibers in the layers 11 and 12 have softening or melting points which are about the same, contact of the layers 11 and 12 with the heater plate 43 will also cause softening of the fibers in the nonwoven layer 12, thus also effecting a fusible bond directly between the layers 11 and 12.

Last, as illustrated in FIG. 7, after passing by the heater plate 43, the fabric 10 passes through a tenterframe 70 which circulates air over the fusibly bonded fabric 10 to cool it. The fabric 10 then continues on to the conveying or takeup means 60.

As may be seen from the foregoing description, the present invention permits manufacture of a fabric having the desired dimensional stability without the use of messy and hazardous liquids such as latex. Also, because the nonwoven second layer 12 may be of the same width as the woven first layer 11, there is no need to out away the edges of the fabric 10.

In the drawings and specification, there have been disclosed typical preferred embodiments of the invention. Although specific terms have been employed, they have been used in a generic and descriptive sense only and not for purposes of limitation, the scope of the invention being set forth in the following claims.

That which is claimed:

1. A fabric having the desired dimensional stability without the presence of a latex backing which is normally present thereon, comprising:
    a woven first layer formed of yarns of thermoplastic fibers with some of the fibers having a lower melting temperature then other fibers;
    a nonwoven fibrous second layer contacting said woven first layer in underlying relation; and
    a plurality of thermoplastic fibers including said lower melting temperatures fibers being displaced from said woven first layer and extending into and through said nonwoven second layer, said displaced thermoplastic fibers being flattened against the distal side of said nonwoven second layer and fusibly bonded thereto to interconnect said woven first layer and said nonwoven second layer to each other.

2. The fabric defined in claim 1 wherein said woven first layer comprises weft yarns formed of polyolefin fiber and wherein said displaced and fusibly bonded thermoplastic fibers comprise said polyolefin fibers forming said weft yarns.

3. The fabric defined in claim 2 wherein said weft yarns formed of polyolefin fibers are much larger in size than said warp yarns, and wherein the greater number of said displaced fibers extending into and through said nonwoven second layer are polyolefin fibers of said weft yarns.

4. The fabric defined in claim 2 wherein said nonwoven second layer comprises polyolefin fibers having a softening temperature substantially the same as said polyolefin fibers in said woven first layer and wherein said nonwoven second layer is fusibly bonded directly to the underside of said woven first layer.

5. The fabric defined in claim 2 wherein said nonwoven second layer comprises fibers having a higher softening temperature than said polyolefin fibers of said weft yarns in said woven first layer.

6. The fabric defined in claim 2 wherein said nonwoven second layer comprises nylon 6, 6 fibers having a higher softening temperature than said polyolefin fibers of said weft yarns in said woven first layer.

7. The fabric defined in claim 1 wherein said nonwoven fibrous second layer has a weight of no more than about 1.0 ounce per square yard.

8. The fabric defined in claim 1 wherein said woven first layer comprises weft yarns formed of nylon 6 fibers and wherein said displaced and fusibly bonded thermoplastic fibers comprise said nylon 6 fibers forming said weft yarns, and wherein said nonwoven second layer comprises nylon 6, 6 fibers having a higher softening temperature than said nylon 6 fibers forming said weft yarns.

9. The fabric defined in claim 8 wherein said weft yarns formed of nylon 6 fibers are much larger in size than said warp yarns, and wherein the greater number of said displaced fibers extending into and through said nonwoven second layer are nylon 6 fibers of said weft yarns.

10. A fabric having the desired dimensional stability without the presence of a latex backing which is normally present thereon, comprising:
- a woven first layer formed of weft yarns of polyolefin fibers having a relatively low melting temperature and warp yarns formed of polyester fibers having a softening temperature considerably higher than the softening temperature of said polyolefin fibers forming said weft yarns;
- a nonwoven second layer contacting said first layer in underlying relation and formed of polyolefin fibers having a softening temperature substantially the same as said polyolefin fibers forming said weft yarns in said woven first layer, said nonwoven second layer being fusibly bonded to the underside of said woven first layer; and
- a plurality of fibers displaced from said warp and weft yarns in said woven first layer and extending into and through said nonwoven second layer and being flattened against the distal side of said nonwoven second layer, wherein said polyolefin fibers displaced from said weft yarns are fusibly bonded to said nonwoven second layer to further interconnect said woven first layer and said nonwoven second layer to each other.

11. A fabric having the desired dimensional stability without the present of a latex backing which is normally present thereon, comprising:
- a woven first layer formed of weft yarns of nylon 6 fibers and warp yarns formed of fibers selected from the group comprising nylon 6 and nylon 6,6 fibers with some of the fibers having a lower melting temperature than other fibers;
- a nonwoven second layer contacting said first layer in underlying relation and comprising nylon 6,6 fibers having a higher softening temperature than said nylon 6 fibers forming said weft yarns in said woven first layer; and
- a plurality of fibers including said lower melting temperatures fibers being displaced from said warp and weft yarns in said woven first layer and extending into and through said nonwoven second layer and being flattened against the distal side of said nonwoven second layer, wherein said nylon 6 fibers displaced from said weft yarns are fusibly bonded to said nonwoven second layer to interconnect said woven first layer and said nonwoven second layer to each other.

12. A fabric having the desired dimensional stability without the presence of a latex backing which is normally present thereon, comprising:
- a woven first layer formed of weft yarns comprising polyolefin fibers and warp yarns comprising polyester fibers having a softening temperature considerably higher than said polyolefin fibers forming said weft yarns;
- a nonwoven second layer contacting said first layer in underlying relation and comprising nylon 6, 6 fibers having a higher softening temperature than said polyolefin fibers in said weft yarns; and
- a plurality of fibers including lower melting polyolefin fibers displaced from said weft yarns in said woven first layer and extending into and through said nonwoven second layer and being flattened against the distal side of said nonwoven second layer, wherein said lower melting polyolefin fibers displaced from said weft yarns are fusibly bonded to said nonwoven second layer to interconnect said woven first layer and said nonwoven second layer to each other.

13. A method of producing a fabric having the desired dimensional stability without the presence of a latex backing which is normally present thereon, comprising the steps of:
- needle punching a woven first layer having yarns formed of thermoplastic fibers, with some of the fibers having a lower melting temperature than other fibers, to a nonwoven fibrous second layer to displace a plurality of thermoplastic fibers including said lower melting temperature fibers from the woven first layer into and through the nonwoven second layer such that portions of the displaced thermoplastic fibers protrude beyond the distal side of the second layer; and
- applying heat to the nonwoven second layer and the displaced thermoplastic fibers protruding therefrom so as to soften the protruding displaced thermoplastic fibers and to effect a bonding of the softened displaced thermoplastic fibers with the second layer while flattening the protruding displaced thermoplastic fibers against the nonwoven second layer.

14. The method defined in claim 13 wherein the nonwoven second layer is also formed of thermoplastic fibers, and wherein said step of applying heat to the second layer and the displaced thermoplastic fibers protruding therefrom also softens the thermoplastic fibers of the nonwoven second layer to effect a bonding directly between the nonwoven second layer and the woven first layer.

15. The method defined in claim 13 wherein said step of applying heat comprises heating the nonwoven second layer and displaced thermoplastic fibers protruding therefrom by directing the fabric while moving into engagement with a heated surface having a temperature of about 330° F.

* * * * *

UNITED STATES PATENT AND TRADEMARK OFFICE
CERTIFICATE OF CORRECTION

PATENT NO. : 5,192,601
DATED : March 9, 1993
INVENTOR(S) : Neisler

It is certified that error appears in the above-identified patent and that said Letters Patent is hereby corrected as shown below:

In Column 4, line 27, delete "Weft" and insert --weft--.

In Column 4, line 29, delete "Warp" and insert --warp--.

In Column 4, line 32, delete "Warp" and insert --warp--.

In Column 4, line 60, delete "Weft" and insert --weft--.

In Column 5, line 40, delete "Of" and insert --of--.

In Column 5, line 58, delete "Weft" and insert --weft--.

In Column 8, line 7, delete "Vertically" and insert --vertically--.

In Column 8, line 12, delete "Warp" and insert --warp--.

In Column 9, line 4, delete "45" and insert --48--.

In Column 9, line 15, delete "45" and insert --48--.

In Column 10, line 1, delete "out" and insert --cut--.

In Column 10, line 29, delete "fiber" and insert --fibers--.

UNITED STATES PATENT AND TRADEMARK OFFICE
CERTIFICATE OF CORRECTION

PATENT NO. : 5,192,601

DATED : March 9, 1993

INVENTOR(S) : Neisler

It is certified that error appears in the above-identified patent and that said Letters Patent is hereby corrected as shown below:

In Column 11, line 27, delete "present" and insert --presence--.

Signed and Sealed this

Twenty-third Day of November, 1993

BRUCE LEHMAN

*Attest:*

*Attesting Officer*     Commissioner of Patents and Trademarks